US011604758B2

(12) United States Patent
Zhang et al.

(10) Patent No.: US 11,604,758 B2
(45) Date of Patent: Mar. 14, 2023

(54) SYSTEMS AND METHODS FOR SYSTOLIC ARRAY DESIGN FROM A HIGH-LEVEL PROGRAM

(71) Applicant: Xilinx, Inc., San Jose, CA (US)

(72) Inventors: Peng Zhang, Los Angeles, CA (US); Cody Hao Yu, Los Angeles, CA (US); Xuechao Wei, Beijing (CN); Peichen Pan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 149 days.

(21) Appl. No.: 17/096,742

(22) Filed: Nov. 12, 2020

(65) Prior Publication Data

US 2021/0081354 A1 Mar. 18, 2021

Related U.S. Application Data

(63) Continuation of application No. 15/962,916, filed on Apr. 25, 2018, now Pat. No. 10,838,910.

(Continued)

(51) Int. Cl.
*G06F 9/30* (2018.01)
*G06F 15/80* (2006.01)
(Continued)

(52) U.S. Cl.
CPC ...... *G06F 15/8046* (2013.01); *G06F 15/8092* (2013.01); *G06N 3/0454* (2013.01);
(Continued)

(58) Field of Classification Search
CPC ............. G06F 15/8046; G06F 15/8092; G06F 15/8007; G06N 3/0454; G06N 3/063; G06N 3/08
See application file for complete search history.

(56) References Cited

U.S. PATENT DOCUMENTS 8,930,926 B2 * 1/2015 Bastoul .................. G06F 8/453
717/149
11,106,968 B1 * 8/2021 Ghasemi .............. G06N 3/0454
(Continued)

OTHER PUBLICATIONS

Aydonat et al.; An OpenCLTM Deep Learning Accelerator on Arria 10; Feb. 2017; ACM (Year: 2017).*

*Primary Examiner* — Corey S Faherty
(74) *Attorney, Agent, or Firm* — David R. Stevens; Stevens Law Group

(57) ABSTRACT

Systems and methods for automated systolic array design from a high-level program are disclosed. One implementation of a systolic array design supporting a convolutional neural network includes a two-dimensional array of reconfigurable processing elements arranged in rows and columns. Each processing element has an associated SIMD vector and is connected through a local connection to at least one other processing element. An input feature map buffer having a double buffer is configured to store input feature maps, and an interconnect system is configured to pass data to neighboring processing elements in accordance with a processing element scheduler. A CNN computation is mapped onto the two-dimensional array of reconfigurable processing elements using an automated system configured to determine suitable reconfigurable processing element parameters.

20 Claims, 13 Drawing Sheets

Related U.S. Application Data

(60) Provisional application No. 62/490,912, filed on Apr. 27, 2017.

(51) Int. Cl.
    *G06N 3/08*     (2023.01)
    *G06N 3/04*     (2023.01)
    *G06N 3/063*     (2023.01)

(52) U.S. Cl.
    CPC ............... *G06N 3/063* (2013.01); *G06N 3/08* (2013.01); *G06F 15/8007* (2013.01)

(56) References Cited

U.S. PATENT DOCUMENTS

| | | | | |
|---|---|---|---|---|
| 2010/0070956 | A1* | 3/2010 | Leung | G06F 8/452 |
| | | | | 717/160 |
| 2016/0048394 | A1* | 2/2016 | Vorbach | G06F 9/3859 |
| | | | | 712/32 |
| 2018/0189981 | A1* | 7/2018 | Singh | G06F 13/10 |
| 2018/0314671 | A1* | 11/2018 | Zhang | G06N 3/063 |
| 2019/0042923 | A1* | 2/2019 | Janedula | G06N 3/0445 |

\* cited by examiner

```
// Outer Loops
L0: for (L0 = 0; L0 < l0; L0++)
...
Ln: for (Ln = 0; L0 < ln; Ln++)
// Middle Loops
S0: for (S0 = 0; S0 < s0; S0++)
...
Sn: for (Sn = 0; S0 < sn; Sn++)
// Inner Loops
T0: for (T0 = 0; T0 < t0; T0++)
T1: for (T1 = 0; T1 < t1; T1++)
T2: for (T2 = 0; T2 < t2; T2++)
// Original Loop Body
```

- 702 — // Outer Loops
- 704 — // Middle Loops
- 706 — // Inner Loops
- 708 — // Original Loop Body
- 700

FIG. 7

SYSTEMS AND METHODS FOR SYSTOLIC ARRAY DESIGN FROM A HIGH-LEVEL PROGRAM

RELATED APPLICATION

This application is a continuation of U.S. application Ser. No. 15/962,916 entitled "Systems And Methods For Systolic Array Design From A High-Level Program" and filed Apr. 25, 2018, and claims the benefit of U.S. Provisional Application Ser. No. 62/490,912 entitled "Apparatus And Method For Systolic Array Compilation For FPGAs From High-Level Programming Languages" and filed Apr. 27, 2017, which is hereby incorporated herein by reference in its entirety.

TECHNICAL FIELD

The present disclosure relates to automated systems and methods for systolic array design and implementation on reconfigurable processing platforms such as a field-programmable gate array (FPGA).

BACKGROUND AND SUMMARY

Convolutional neural networks (CNNs) are computing structures commonly used in deep learning applications, including image/video classification and analysis, natural language understanding, and autonomous vehicle or robotic control systems. Many of these implementations are realized on FPGAs using systolic array computing architectures. However, adapting a systolic array architecture to function in a large-scale CNN implementation is a challenging design problem that requires consideration of both computation and communication aspects. There exists a need, therefore, for a methodology that enables an automated design flow to implement an efficient systolic array architecture on a suitable computing device.

In one embodiment, a systolic array supporting a convolutional neural network (CNN) can include a two-dimensional array of reconfigurable processing elements arranged in rows and columns, with each processing element having an associated SIMD vector and being connected through a local connection to at least one other processing element. An input feature map buffer having a double buffer can be used for storing input feature maps. An interconnect system can pass data to neighboring processing elements (using, for example, in a processing element scheduler), and a CNN computation is mapped onto the two-dimensional array of reconfigurable processing elements using an automated system configured to determine suitable reconfigurable processing element parameters.

In another embodiment, a method for defining a computational system with fine-grained data reuse includes defining an iterator vector which lists loop iterators from an outermost loop to an inner loop in a loop nest. An iteration domain D which defines a range of loop iterators is set, and an access function calculates how to map the loop iterators into access indexes of an array r, wherein each array r on a loop l requires data accessed on array r in different loop l iterations to be identical.

In another embodiment, a method for defining a computational system includes finding a set of feasible systolic array configurations for a nested loop that functions as a machine learning system. Given a feasible systolic array configuration, determining various bounds of a plurality of middle loops to improve design throughput relies on pruning feasible systolic array configuration candidates based at least in part on DSP and BRAM utilization.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 7 is a schematic diagram depicting a set of nested loops used as a basis for a loop tiling representation associated with an embodiment of a systolic array.

DETAILED DESCRIPTION

The systems and methods described herein enable a design and implementation of neural networks, convolutional neural networks (CNN), recurrent neural networks, and other machine learning computing systems using systolic array architectures. This process can include receiving a model of a computational system for machine learning, performing various procedures and parameter setting for the model, and generating a systolic array architecture that is suitable for implementation on a reconfigurable computing platform such as an FPGA. Some embodiments may improve performance parameters such as system throughput and include features such as data reuse.

Figure 1:
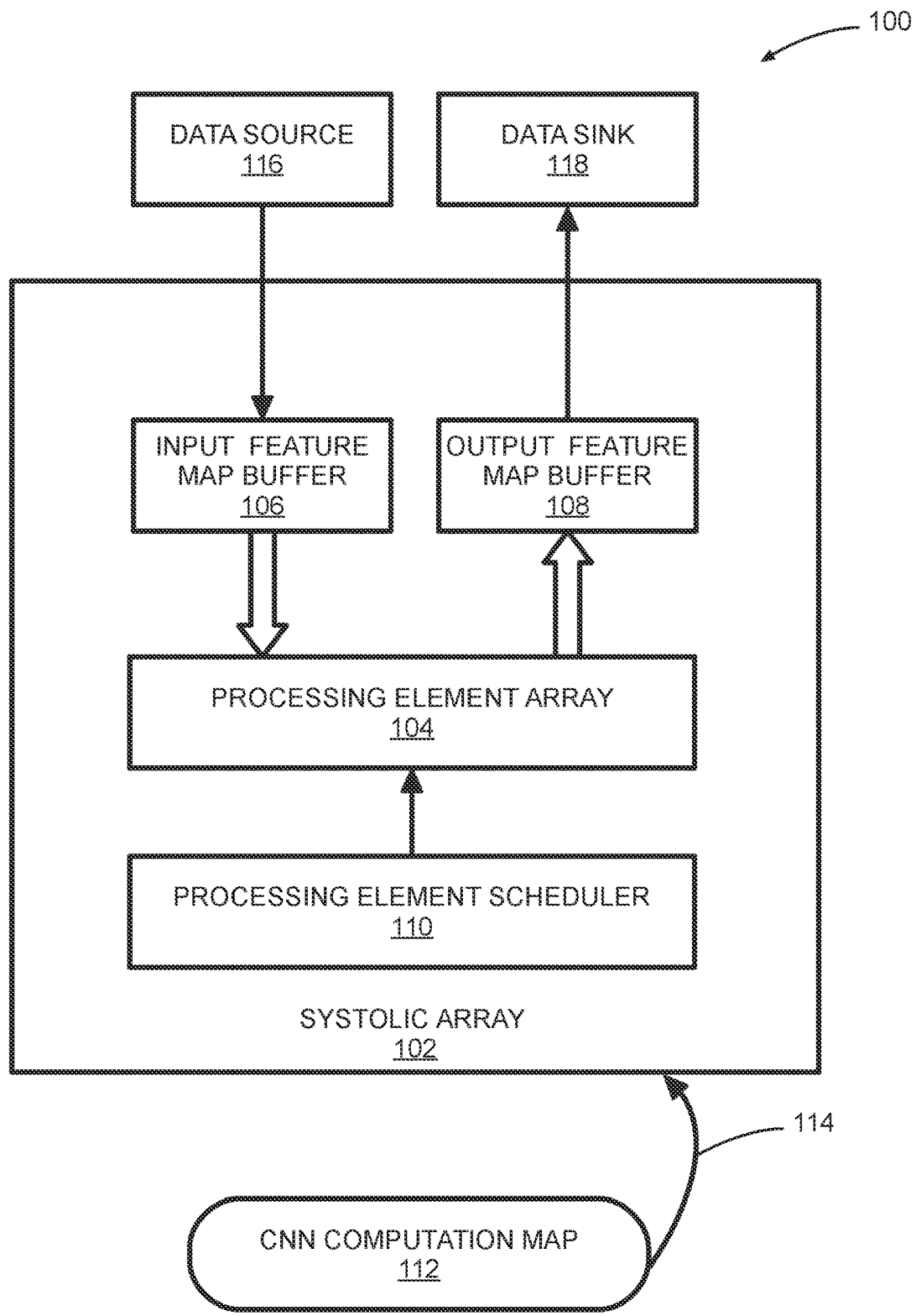
FIG. 1 is a block diagram depicting an embodiment of a systolic architecture generated by a CNN computation map.

FIG. 1 is a block diagram depicting an embodiment of a systolic array architecture 100 generated by a CNN computation map. In some embodiments, a CNN computation map 112 generated by the systems and methods described herein is used to realize a systolic array 102 that is mapped to a suitable computing device via a mapping 114. In particular embodiments, mapping 114 may be implemented from a high-level program such as C or C++ to a bitstream for an FPGA.

In some embodiments, systolic array 102 may include a processing element array 104. Processing element array 104 may be comprised of a two-dimensional array of a plurality of processing elements (also known as process elements and abbreviated as PE) as discussed herein. In some embodiments the processing elements may include reconfigurable processor blocks, including but not limited to digital signal processor (DSP) blocks. In particular embodiments, each DSP block may include a single instruction multiple data (SIMD) vector in its architecture. In other embodiments, the processing elements may be configured to implement mathematical operations that include addition, subtraction, multiplication and division, and the processing elements may include lookup tables.

In some embodiments, systolic array 102 may include an input feature map buffer 106 and an output feature map buffer 108, where input feature map buffer 106 is configured to read data from a data source 116 and transmit this data to processing element array 104, and output feature map buffer 108 is configured to read data from processing element array 104 and transmit this data to a data sink 118. In some embodiments, data source 116 may include any combination of analog-to-digital converters, memory units (e.g., RAM or ROM), a digital imaging device, and so on. In particular embodiments, input data from data source 116 may be digital image data. In some embodiments, data sink 118 may include any combination of memory units, display drivers, and so on. Details about input feature map buffer 106 and output feature map buffer 108 are provided herein.

Some embodiments of systolic array architecture 100 may include a processing element scheduler 110 that is configured to enable data passing between individual processing elements that comprise processing element array 104 based on specified timing protocols. Details of processing element scheduler 110 are described herein.

In some embodiments, a CNN computation or CNN architecture may be defined in a high-level program such as C or C++. This definition is translated to an FPGA bitstream by the processes described herein.

Some embodiments of CNN architectures involve convolution operations, characterized by multiple nested loops involving multiplication and addition operations. The present disclosure presents methods that allow implementing parallelism in the designed systolic array architecture to design highly efficient computing architectures.

Figure 2:
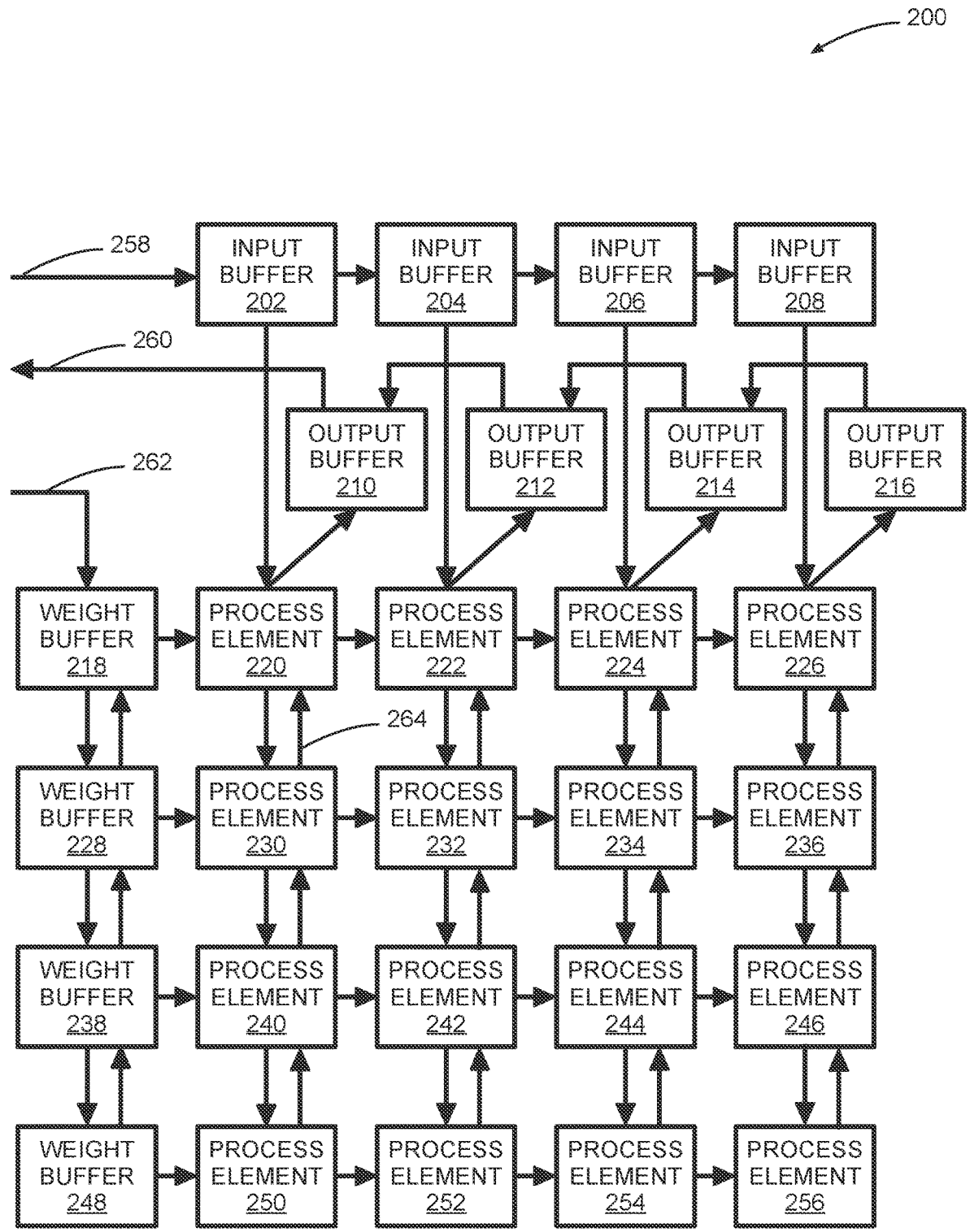
FIG. 2 is a block diagram depicting an embodiment of a systolic array architecture as generated by a CNN computation map.

FIG. 2 is a block diagram depicting an embodiment of a systolic array architecture 200 as generated by a CNN computation map. In some embodiments, systolic array architecture 200 comprises a two-dimensional array of process elements (also known as processing elements, and abbreviated as PE). FIG. 2 depicts a two-dimensional array of processing elements: a process element 220, a process element 222, a process element 224, a process element 226, a process element 230, a process element 232, a process element 234, a process element 236, a process element 240, a process element 242, a process element 244, a process element 246, a process element 250, a process element 252, a process element 254, and a process element 256. In the two-dimensional array comprised of processing element 220 through processing element 256, processing elements 220 through processing element 256 are interconnected via an interconnect system that allows a process element to pass to a neighboring process element or receive data from a neighboring process element in accordance with timing protocols implemented by a processing element scheduler such as processing element scheduler 110. For example, FIG. 2 shows a bidirectional interconnect 264 between process element 220 and process element 230. On the other hand, process element 220 can only send data to process element 222 via an associated unidirectional data link.

In some embodiments, each of process element 220 through process element 256 includes a DSP block or a vector processor consisting of multiple DSP blocks. In other embodiments, each of process element 220 through process element 256 may be configured to implement mathematical operations that include addition, subtraction, multiplication and division, and process element 220 through process element 256 may include lookup tables or some other compute block. In still other embodiments, a combination of process element 220 through process element 256 may include some combination of DSP blocks and lookup tables.

In some embodiments, the 2-D topology associated with the two-dimensional array of process element 220 through process element 256 matches the 2-D structure in the FPGA layout so that it can achieve associated timing constraints because of low routing complexity. In some embodiments, a third dimension is added to this two-dimensional array of process elements by each of process element 220 through process element 256 having a associated SIMD vector that is configured to perform vector accumulation operations. In some embodiments, a parallelization factor of the SIMD vector is a power of two due to dedicated inter-DSP accumulation interconnects in modern FPGAs. This architecture is able to address a timing issue for massive parallelization within a CNN realization. While FIG. 2 depicts a 4×4 array of process elements as an illustration, the concept can be extended to work with thousands of process elements and associated supported components as described herein.

FIG. 2 also depicts an input buffer 202, an input buffer 204, an input buffer 206, and an input buffer 208. Input buffer 202 through input buffer 208 are each configured to read data from a data source such as data source 116. Each of input buffer 202 through input buffer 208 may also be referred to as an input feature map buffer. In some embodiments, input buffer 202 reads in data from a data source via an input line 258, and sequentially sends data to input buffer 204 via a unidirectional data link, and so on, as shown in FIG. 2. In particular embodiments, a sequencing of transferring data is determined by a processing element scheduler such as processing element scheduler 110. Each of input buffer 202, input buffer 204, input buffer 206 and input buffer 208 sends data to process element 220, process element 222, process element 224, and process element 228 respectively via a unique unidirectional interconnect.

In some embodiments, systolic array architecture 200 includes a weight buffer 218, a weight buffer 228, a weight buffer 238, and a weight buffer 248, each of which is configured to transmit weight data associated with the CNN, respectively to process element 220, process element 230, process element 240, and process element 250. In particular embodiments, weight buffer 218 reads in weight data via a weight line 262, and sequentially sends this weight data to weight buffer 228, and so on. Weight data is also transmitted from each of weight buffer 218 through weight buffer 248 to correspondingly connected process element 220 through process element 250 respectively.

In some embodiments, each of process element 220, process element 222, process element 224, and process element 226 is each connected (coupled) to an output buffer 210, an output buffer 212, an output buffer 214, and an output buffer 216 respectively. Output buffer 210 through output buffer 216 are each configured to receive data from process element 220 through process element 226 and send the data out via an output line 260. Each of output buffer 210 through output buffer 216 may also be referred to as an output feature map buffer. As shown in FIG. 2, output buffer 216 sends data via a unidirectional data link to output buffer 214, and so on, with output buffer 210 sending data out over output line 260. All data flow in systolic array architecture 200 is sequenced by a processing element scheduler such as processing element scheduler 110.

As shown in FIG. 2, a global and large fan-out interconnect associated with a systolic array architecture 200 is split into local interconnects between neighboring PEs. In addition, any input/output data are shifted into/from a PE array and between the neighboring PEs so that multiplexes are eliminated. With the local, short, peer-to-peer interconnects, systolic array architecture 200 can achieve high frequency even in the case of massive parallelization and when extended to include over a thousand PEs.

During operation of systolic array architecture 200, a PE passes input data to a neighboring PE in vertical direction and passes weight data to neighboring PE in horizontal direction every cycle, and it also accumulates a multiplier of the input data and weight data. The output feature map data are shifted out across the PE array as well when they are ready after multiple rounds of accumulation using the bidirectional interconnect feature between PEs as shown in FIG. 2. Each of input buffer 202 through input buffer 208 contains a double buffer—one buffer is used to store the data fetched from external memory, and the other is used to feed the data into the PE.

In a double buffer embodiment, all the input feature map data can be shifted across input buffer 202 through input buffer 208 in the horizontal direction, while an input buffer will selectively store the data belonging to the corresponding column of PEs by a filter, described herein. A similar double buffer structure is applied to each of weight buffer 218 through weight buffer 248, and output buffer 210 through output buffer 216.

In some embodiments, the local interconnect shown in FIG. 2 can include common features often associated with systolic array execution. First, the data required for the computation of the PEs have to be transferred from the PE boundary and across multiple PEs. Since only the boundary PE has the access to input data, data reuse between each row and column of PEs is required. More importantly, a systolic array runs in a regular and synchronized way such that fine-grained pipelining is performed between every neighboring PE. With these features, a suitable scheduling of the PE executions is essential for systolic array design, especially the synchronization of the data on each PE from different directions. This function is performed by processing element scheduler 110.

Figure 3:
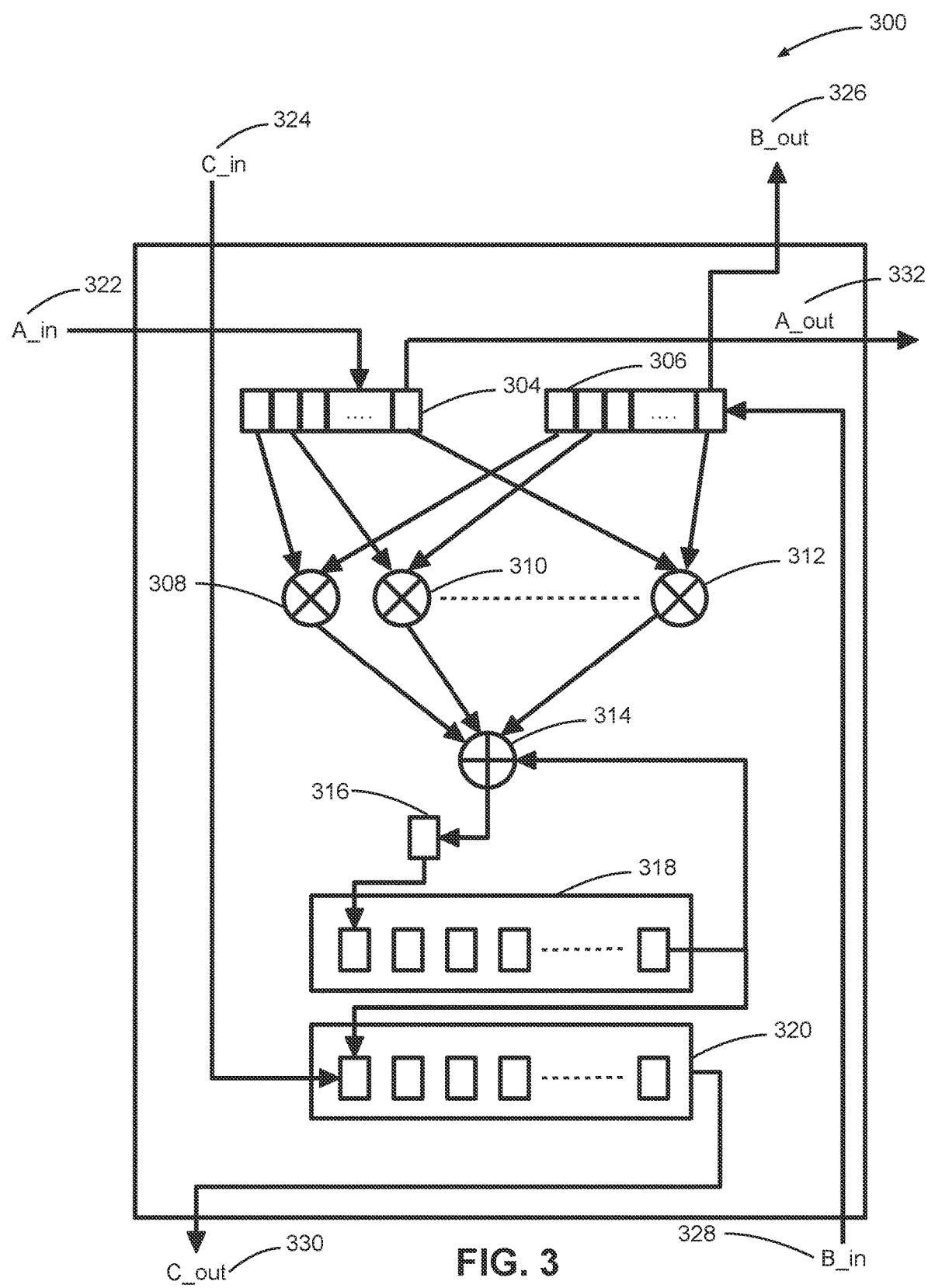
FIG. 3 is a block diagram depicting an embodiment of a processing element used in a systolic array.

FIG. 3 is a block diagram depicting an embodiment of a processing element 300 used in a systolic array. In some embodiments, processing element 300 receives three inputs: an input A_in 322, an input B_in 328, and an input C_in 324. Input A_in 322 is a horizontal input, while input B_in 328 is a vertical input. In some embodiments, input A_in 322 is a weight input, received from a weight buffer or from a neighboring PE in the same row as processing element 300. In particular embodiments, input B_in 328 is data input, received from an input buffer or from a neighboring PE in the same column as processing element 300. Input C_in 324 is an initial value of output data associated with processing element 300.

In some embodiments, input A_in 322 is read by processing element 300 into an A register 304. A register 304 also produces an output A_out 332. Output A_out 332 is a horizontal output comprised of weight data, transmitted to a PE in the same row as processing element 300. In some embodiments, input B_in 328 is read by processing element into a B register 306. B register 306 produces an output B_out 326. Output B_out 326 is a vertical output comprised of input data, transmitted to a PE in the same column as processing element 300. In some embodiments, multiple weight data elements and input data elements are shifted into and out of each PE every cycle via parallel channels. A parallelism factor of this data shifting is a parameter in a micro-architecture template associated with the systolic array.

In some embodiments, each data sample data in A register 304 is pairwise multiplied with a corresponding data sample in B register 306, via a multiplier 308, a multiplier 310, through a multiplier 312. Essentially, each weight data sample in A register 304 is multiplied by an input data sample in B register 306. In some embodiments, each of the multiplications performed by multiplier 308 through multiplier 312 is a SIMD multiplication. Multiplication results from multiplier 308 through multiplier 312 are accumulated by a combination of an adder 314, a register 316 that holds results output by adder 314, and a C cyclic accumulation shift register 318. In some embodiments, C cyclic accumulation shift register 318 rotates every cycle to accumulate the outputs from adder 314 (also known as an adder tree) into different data elements, and each data element rotates to be accumulated several times. A rotation number for each data element is determined by how many data samples are required to be summed up in the algorithm and is also a parameter in a micro-architecture template associated with the systolic array. Once the data elements are ready in C cyclic accumulation shift register 318, they are then shifted out into a C output shifting register set 320. Finally, all the data elements in C output shifting register set 320 are shifted out of the PE via an output channel C_out 330 to the bottom neighboring PEs. Essentially, input Cin 324 is an initial value of data associated with output channel 330, and after accumulation inside the PE in an interleaved way, updated data is sent out to its neighboring PEs via output channel C_out 330, and finally shifted outside the systolic array to form final outputs.

Figure 4:
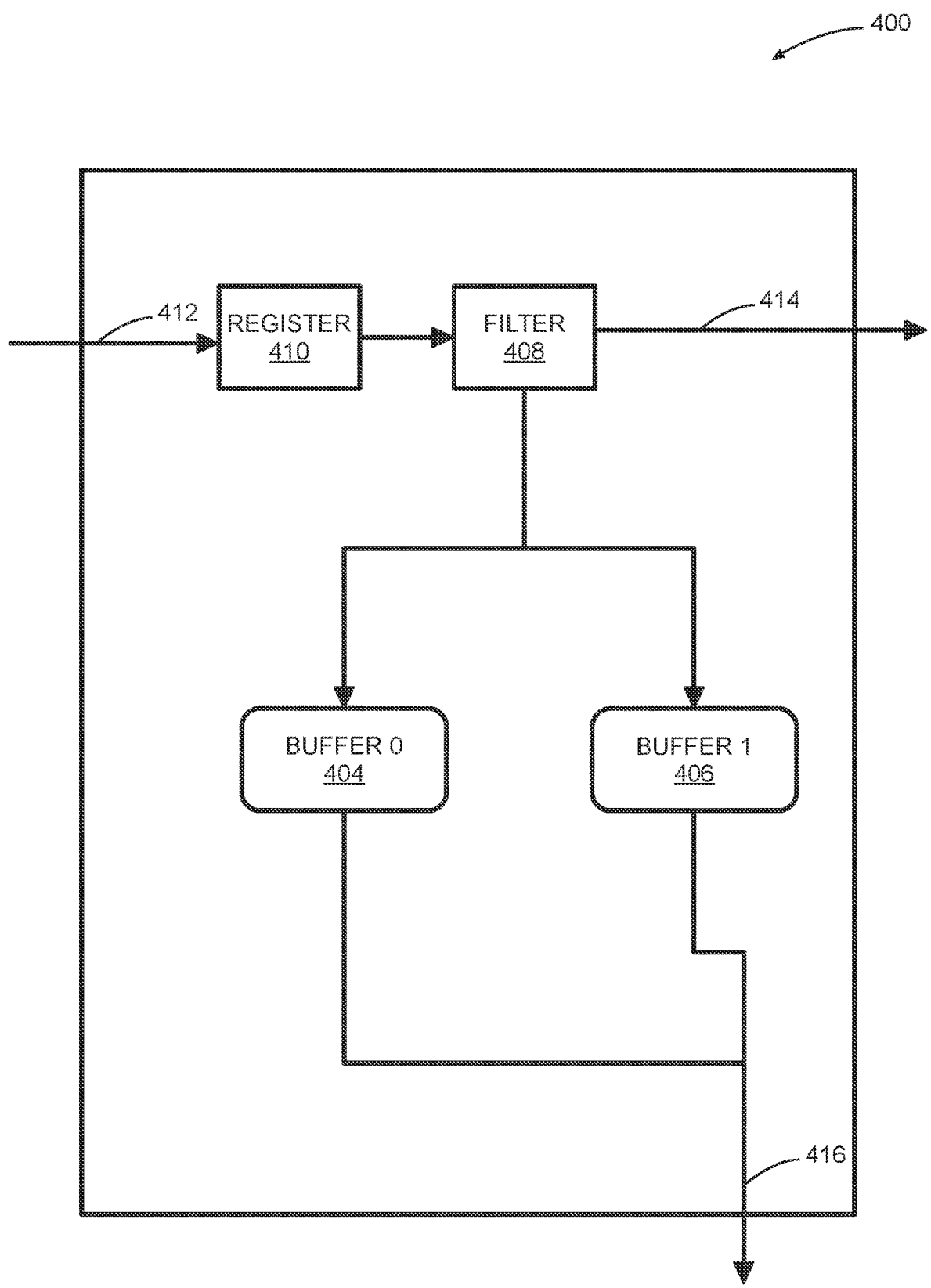
FIG. 4 is a block diagram depicting an embodiment of an input feature map buffer used in a systolic array.

FIG. 4 is a block diagram depicting an embodiment of an input feature map buffer 400 used in a systolic array. In some embodiments, input feature map buffer 400 (also known as an input buffer) includes a register 410 that is configured to receive and store an input from an input line 412, that may be similar to input line 258, or from a neighboring input buffer as depicted in FIG. 2. An output of register 410 is received by a filter 408 that is configured to selectively store data designated for a column of PEs that are associated with input feature map buffer 400. Filter 408 passes through data not associated with this column of PEs to a neighboring input feature map buffer via an output line 414.

In some embodiments, data meant for the column of PEs associated with input feature map buffer 400 is double-buffered via a buffer 0 404 and a buffer 1 406, each of which is configured to receive data from filter 408. In some embodiments, in a first data cycle, buffer 0 404 is configured to store data fetched from an external memory associated with the systolic array while buffer 1 406 is configured to feed data into an adjacent PE. Next, in a second data cycle, buffer 0 404 is configured to feed data into an adjacent PE, while buffer 1 406 is configured to store data fetched from the external memory. Operation of input feature map buffer 400 alternates in this way between the first data cycle and the second data cycle. In some embodiments, each of buffer 0 404 and buffer 1 406 is comprised of an array of buffer segments where each buffer segment is coupled to a neighboring buffer segment via a local connection. In particular embodiments, an architecture of a weight buffer such as weight buffer 218 and an architecture of an output buffer such as output buffer 210 have a similar double-buffered configuration and an associated operation as input feature map buffer 400.

Figure 5:
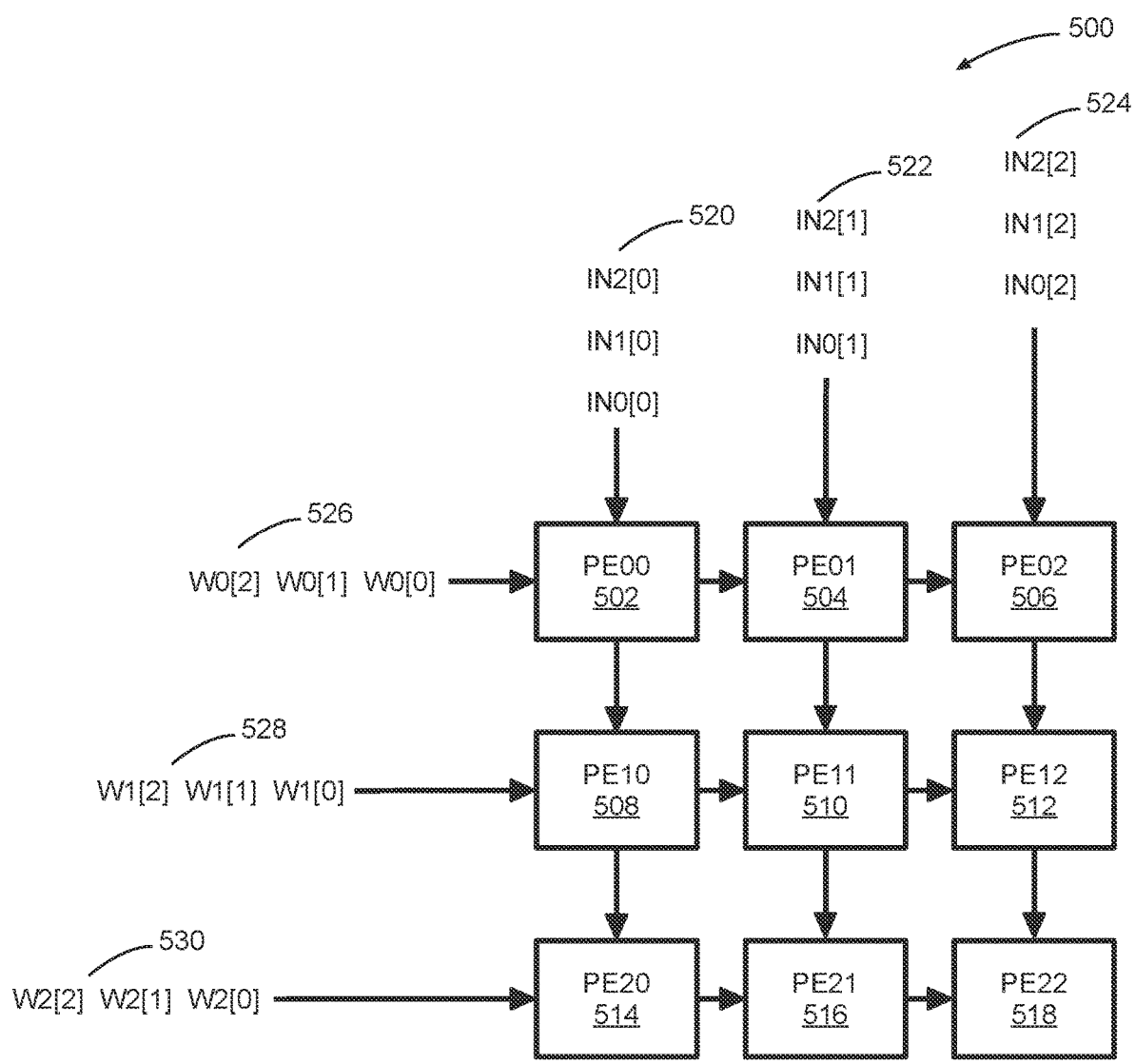
FIG. 5 is a block diagram depicting a cycle-level scheduling associated with an embodiment of a systolic array.

FIG. 5 is a block diagram depicting a cycle-level scheduling associated with an embodiment of a systolic array 500. In some embodiments, systolic array 500 includes a two-dimensional 3×3 array that includes a processing element PE00 502, a processing element PE01 504, a processing element PE02 506, a processing element PE10 508, a processing element PE11 510, a processing element PE12 512, a processing element PE20 514, a processing element PE21 516, and a processing element PE22 518. FIG. 5 also depicts systolic array 500 reading in input data and weight data. In some embodiments, input data samples and weight data samples are sequentially clocked into the individual processing elements.

FIG. 5 depicts a first weight data sequence 526 comprising weight data samples W0[0], W0[1], and W0[2]. First weight data sequence 526 is sequentially clocked in to the first row of systolic array 500 that is comprised of processing element PE00 502, processing element PE01 504, and processing element PE02 506. Here, a terminology Wx[y] denotes a weight data sequence being clocked into row x of systolic array 500 at an array (vector) index y. Similarly, a second weight data sequence 528 comprising weight data samples W1[0], W1[1] and W1[2] is sequentially clocked in to the second row of systolic array 500 that is comprised of processing element PE10 508, processing element PE11 510, and processing element PE12 512. It is important to note that a processing element scheduler (not shown in FIG. 5) synchronizes data transfer such that second weight data sequence 528 is delayed by one clock cycle as compared to first weight data sequence 526. In the 3×3 systolic array 500, a third weight data sequence 530 comprising weight data samples W2[0], W2[1] and W2[2] is sequentially clocked in to the third row of systolic array 500 that is comprised of processing element PE20 514, processing element PE21 516, and processing element PE22 518. A processing element scheduler synchronizes data transfer such that third weight data sequence 530 is delayed by one clock cycle as compared to second weight data sequence 528.

FIG. 5 depicts a first input data sequence 520 comprising input data samples IN0[0], IN1[0], and IN2[0]. First input data sequence 520 is sequentially clocked into the first column of systolic array 500 that is comprised of processing element PE00 502, processing element PE10 508, and processing element PE20 514. Here, a terminology INx[y] denotes an input data sequence being clocked into column y of systolic array 500, at an array (vector) index x. Similarly, a second input data sequence 522 comprising input data samples IN0[1], IN1[1], and IN2[1] is sequentially clocked into the second column of systolic array 500 that is comprised of processing element PE01 504, processing element PE11 510, and processing element PE21 516. A processing element scheduler synchronizes data transfer such that second input data sequence 522 is delayed by one clock cycle as compared to first input data sequence 520. In the 3×3 systolic array 500, a third input data sequence 524 comprising input data samples IN0[2], IN1[2] and IN2[2] is sequentially clocked into the third column of systolic array 500 that is comprised of processing element PE02 506, processing element PE12 512, and processing element PE22 518. A processing element scheduler synchronizes data transfer such that third input data sequence 524 is delayed by one clock cycle as compared to second input data sequence 522. Details about how data is handled by systolic array 500 are provided herein.

Figure 6:
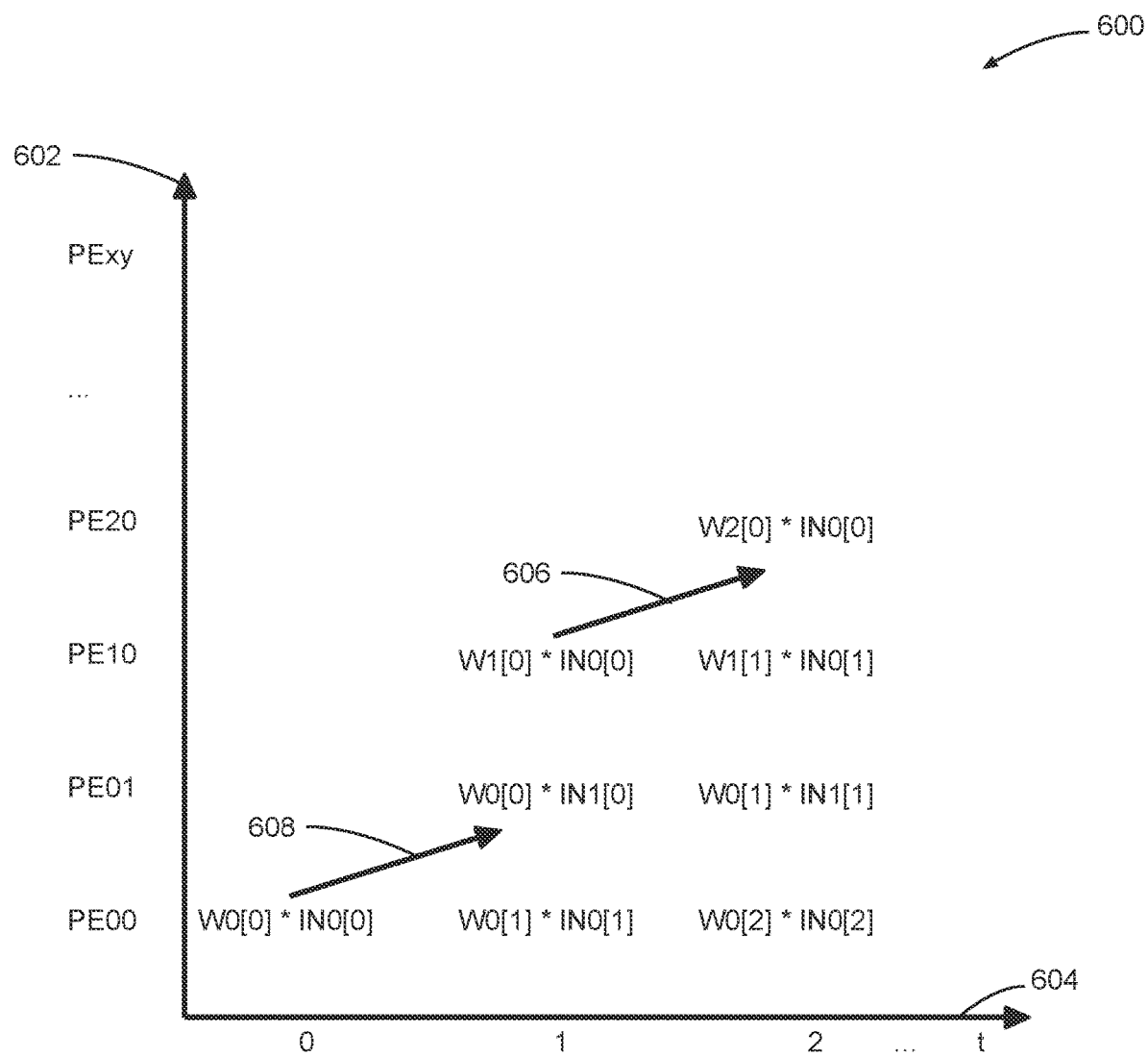
FIG. 6 is a schematic diagram depicting an example of a cycle-level scheduling associated with an embodiment of a systolic array.

FIG. 6 is a schematic diagram depicting an example of a cycle-level scheduling 600 associated with an embodiment of a systolic array. FIG. 6 depicts how weight data samples and input data samples depicted in FIG. 5 are handled by systolic array 500. FIG. 5 depicts a time axis 604 showing time indices 0, 1, through t, and a processing element axis 602 showing processing element PE00 502, processing element PE01 504, processing element PE10 508, processing element PE20 514, and so on through processing element Pxy. (FIG. 5 shows a 3×3 processing element systolic array; Pxy is a generalized processing element designation used to denote any number of processing element indices.) At cycle t on time axis 604, a multiplication of W (a weight data sample) and IN (an input data sample) accumulates on OUT (an output data sample). Initially, at an initial step (index 0 on time axis 604), processing element PE00 502 performs a SIMD multiplication W0[0] *IN[0]. A result from this multiplication is used to update a previous partial accumulation result stored in an output register. During this initial step, all other processing elements (e.g., processing element PE11 510) are stalled while they await weight data samples and input data samples. At index 1 on time axis 604, weight data associated with processing element PE00 502 (i.e., W0[0]) is passed to processing element PE01 504 (shown by an arrow 608), while input data associated with processing element PE00 502 (i.e., IN[0]) is passed to processing element PE10 508 (this data passing not shown in FIG. 6). Processing element PE01 504 and processing element PE10 508 can now begin processing data. Specifically, processing element PE01 504 performs an operation W0[0] *IN1[0], while processing element PE10 508 performs an operation W1[0] *IN0[0]. Processing element PE00 502, on the other hand, is able to process a fresh weight data sample and a fresh input data sample, performing an operation W0[1] *IN0[1]. At index 2 on time axis 604, input data associated with processing element PE10 508 (i.e., IN0[0]) is passed to processing element PE20 514, which also receives weight data W2[0] to perform an operation W2[0] *IN0[0]. This is shown by an arrow 606. At this time index, processing element PE10 508 performs an operation W1[1] *IN0[1], processing element PE01 504 performs an operation W0[1] *IN1[1], and processing element PE00 502 performs an operation W0[2] *IN0[2]. All data shifting and associated computing is performed based on such a cycle-level scheduling. For the 3×3 array of processing elements shown in FIG. 5, starting with processing element PE00 502, with each clock cycle, subsequent processing elements move form a stalled state into an active state. After 5 cycles, all processing elements will be active and synchronously reading data from previous neighbor processing elements, performing computations, and passing data to an adjacent processing element in each cycle. After accumulation within a processing element ends, OUT data in an associated shift register is shifted across vertical (column) processing elements to be stored in an output buffer such as output buffer 210.

FIG. 7 is a schematic diagram depicting a set of nested loops 700 used as a basis for a loop tiling representation associated with an embodiment of a systolic array. In some embodiments, set of nested loops 700 includes an original loop body 708 that is comprised of a set of outer loops (L0-Ln) 702, a set of middle loops (S0-Sn) 704, and a set of inner loops (T0-T2) 706. In some embodiments, a loop tiling representation establishes the link between a systolic array architecture and an original high-level program code. The tiled loops in an intermediate representation contain various architecture considerations for the systolic array, including PE array mapping, PE array shape, and data reuse strategy.

In some embodiments, set of nested loops 700 are mapped to a loop tiling architecture associated with a systolic array, in a following sense. Assuming each data block is processed independently of another data block in the systolic array, each data block corresponds to an iteration of outer loops (L0-Ln) 702. In some embodiments, data blocks are image data blocks. Since data blocks are processed independently, outer loops (L0-Ln) 702 do not affect a throughput of the systolic array. Once a data block is fetched from off-chip memory, it is stored in input buffers such as input buffer 202, and weight buffers such as weight buffer 218, for data reuse. Middle loops (S0-Sn) 704 represent a sequential processing of feeding data from input buffers to the PE array. The bounds of the middle loops, defined by a vector $\vec{s} = (s_0, s_1, \ldots s_n)$, determine sizes of a data reuse buffer. Any reuse data accessed by the PEs is represented by array access addresses which are indexed by iterators of middle loops (S0-Sn) 704 as discussed herein.

In some embodiments, parallel execution is performed in a PE array in a fine-grained pipeline. In some embodiments, inner loops (T0-T2) 706 represent parallelism in the PE array, where each iteration of inner loops (T0-T2) 706 corresponds to a parallel DSP unit in the array. An architectural shape of the systolic array is determined by the bounds of inner loops $t=(t_0, t_1, t_2)$, while a systolic array mapping feasibility is determined by a relation between inner loop iterators and array access addresses in the loop body.

Figure 8:
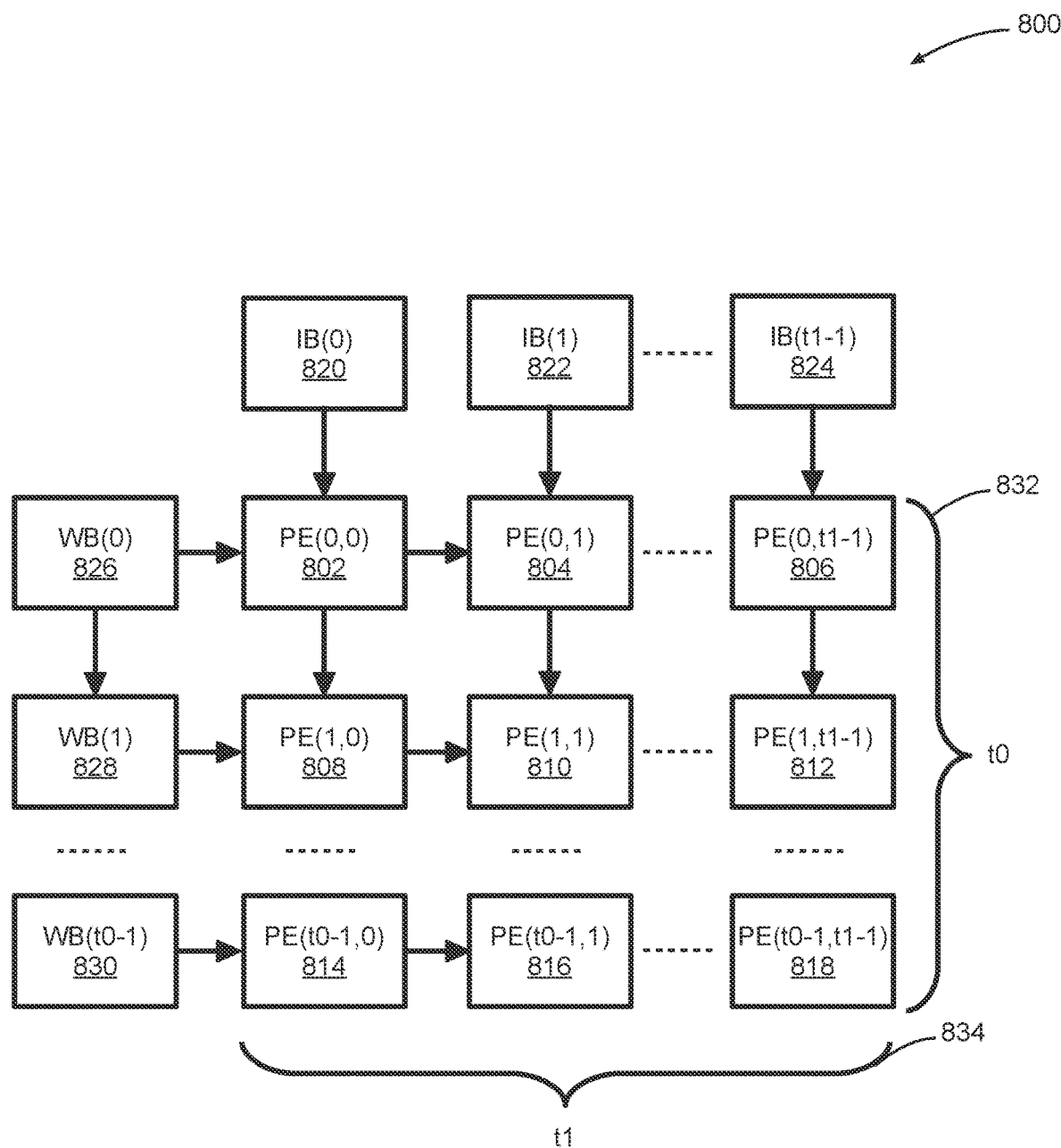
FIG. 8 is a block diagram depicting an embodiment of a systolic array that includes loop tiling.

FIG. 8 is a block diagram depicting an embodiment of a systolic array 800 that includes loop tiling. In some embodiments, systolic array 800 includes a t0×t1 two-dimensional array of processing element PE(0, 0) 802, processing element PE(1, 0) 804, through processing element PE(0, t1-1) 806 in a first row; processing element PE(1, 0) 808, processing element PE(1, 1) 810, through processing element PE(1, t1-1) 812 in the second row; through processing element PE(t0-1, 0) 814, processing element PE(t0-1, 1) 816, through processing element PE(t0-1, t1-1) in the t0$^{th}$ row. In FIG. 8, t0 and t1 are loop limits for two of inner loops 706 depicted in FIG. 7. A third loop limit of inner loops 706 depicted in FIG. 7, t2, constitutes a third dimension for systolic array 800, which is incorporated into a SIMD vector for each processing element included in systolic array 800.

In some embodiments, systolic array 800 includes t1 input buffers—input buffer IB(0) 820, input buffer IB(1) 822, through input buffer IB(t1-1) 824. Each of input buffer IB(0) 820 through input buffer IB(t1-1) 824 is associated with a set of middle loops such as middle loops 704, consistent with a loop tiling representation. In other words, input buffer IB(0) 820 may be designated as input buffer IB(0)(IN(s0, . . . sn-1)), as associated with limits of middle loops 704, and so on.

In some embodiments, systolic array 800 includes t0 weight buffers—weight buffer WB(0) 826, weight buffer WB(1) 828, through weight buffer WB(t0-1) 830. Each of weight buffer WB(0) 826 through weight buffer WB(t0) 830 is associated with a set of middle loops such as middle loops 704, consistent with a loop tiling representation. In other words, weight buffer WB(0) 826 may be designated as weight buffer WB(0)(W0(s0, . . . sn-1)), and so on.

In some embodiments, outer loops such as outer loops 702 are implemented on a block-by-block basis by systolic array 800. In this way, a loop tiling implementation in an architecture of systolic array 800 is used to compute a set of nested loops that comprise original loop body 708. In summary, a loop tiling representation includes outer loops 702, middle loops 704, and inner loops 706, where outer loops 702 are configured to compute a plurality of data blocks (e.g., image data blocks) associated with the computational system, middle loops 704 are configured to represent a sequential processing of feeding data from a plurality of input buffers (e.g., input buffer IB(0) 820 through input buffer IB(t1) 826) associated with the computational system to the processing elements, and inner loops 706 are configured to represent parallelism in the systolic array.

Figure 9:
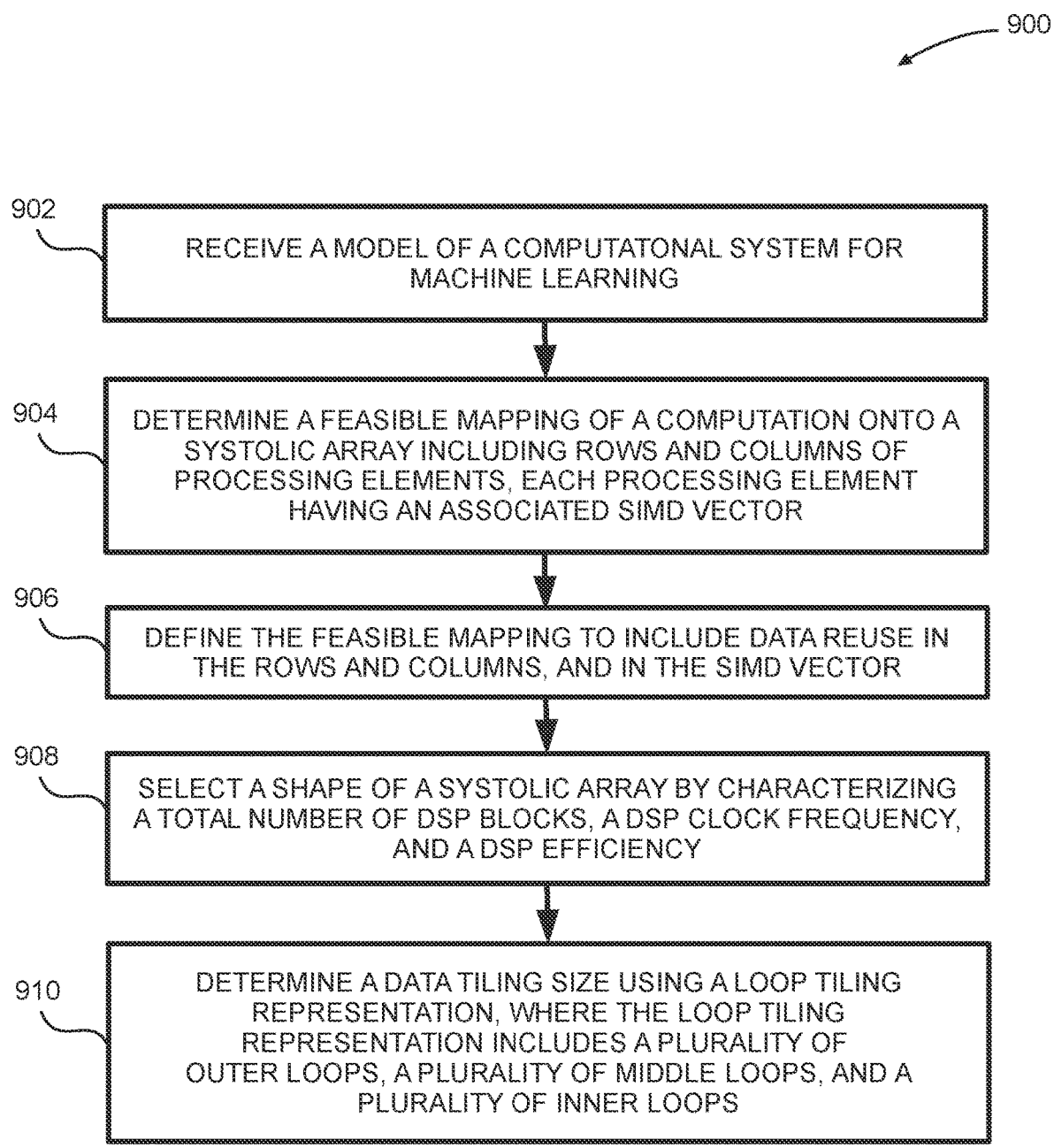
FIG. 9 is a flow diagram depicting an embodiment of a method for defining a computational system for machine learning.

FIG. 9 is a flow diagram depicting an embodiment of a method 900 for defining a computational system for machine learning. At 902, method 900 receives a model of a computational system for machine learning. In some embodiments, this model may be defined in a high-level computing language such as C or C++. At 904, the method determines a feasible mapping of a computation defined in the model onto a systolic array. In particular embodiments, the systolic array includes a two-dimensional array including rows and columns of processing elements. The systolic array also includes a third dimension, where a SIMD vector is associated with each processing element in the systolic array. Next, at 906, method 900 defines the feasible mapping to include data reuse in the rows and columns of the systolic array, and also in each SIMD vector. For example, a systolic array requires data reuse in both directions; therefore the corresponding loops need to carry the data reuse of two different arrays (weight buffer W and input buffer IN), while the third loop needs to carry the accumulation of the output (OUT). Failing to satisfy this rule will cause a non-feasible mapping. In some embodiments, one or more processing elements in the systolic array include DSP blocks or vectors of DSP blocks. In other embodiments, one or more processing elements in the systolic array are configured to implement mathematical operations that include addition, subtraction, multiplication and division, and these processing elements include lookup tables.

Next, at 908, the method selects a shape of the systolic array by characterizing a total number of DSP blocks, a DSP clock frequency, and a DSP efficiency. Selecting a shape of a systolic array includes defining array and SIMD vector sizes, among other variables. In some embodiments, a DSP efficiency is defined as:

$$Eff = \frac{effective operation}{total operation}$$

During a systolic array design process, some systolic array realizations may be less efficient than others for an identical clock frequency (e.g., 280 MHz), despite having a higher DSP count. For example, a DSP array with 16 rows, 10 columns and 8 SIMD vectors may be less efficient than a DSP array with 11 rows, 13 columns and 8 SIMD vectors despite the former having a higher number of DSPs under circumstances where the latter maps more efficiently to a target loop map of (128, 13, 192) trip counts.

Next, at 910, the method determines a data tiling size using a loop tiling representation. In some embodiments, the loop tiling representation includes a plurality of outer loops, a plurality of middle loops, and a plurality of inner loops, as discussed herein. In particular embodiments, loop tiling is associated with defining a data reuse strategy. A data reuse strategy is essential to enhance performance, as data reuse as defined in step 906 may not be sufficient for achieving a required system throughput. In some embodiments, appropriate data tiling implementations add several orders of magnitude of data reuse to base data reuse schemes.

In some embodiments, implementing a data reuse strategy includes exploiting the data reuse carried on multiple for-loops with long reuse distance, which in turn leads to large reuse buffers. However, there are more than ten-thousand design options in the trade-off between on-chip memory utilization and off-chip bandwidth saving, including selection of the arrays to be reused, the loops that carry the data reuse, and tiling sizes for the selected loops carrying data reuse. As an example, with a fully-pipelined systolic array design, an approximate throughput of 621 Gflops can be achieved.

Figure 10:
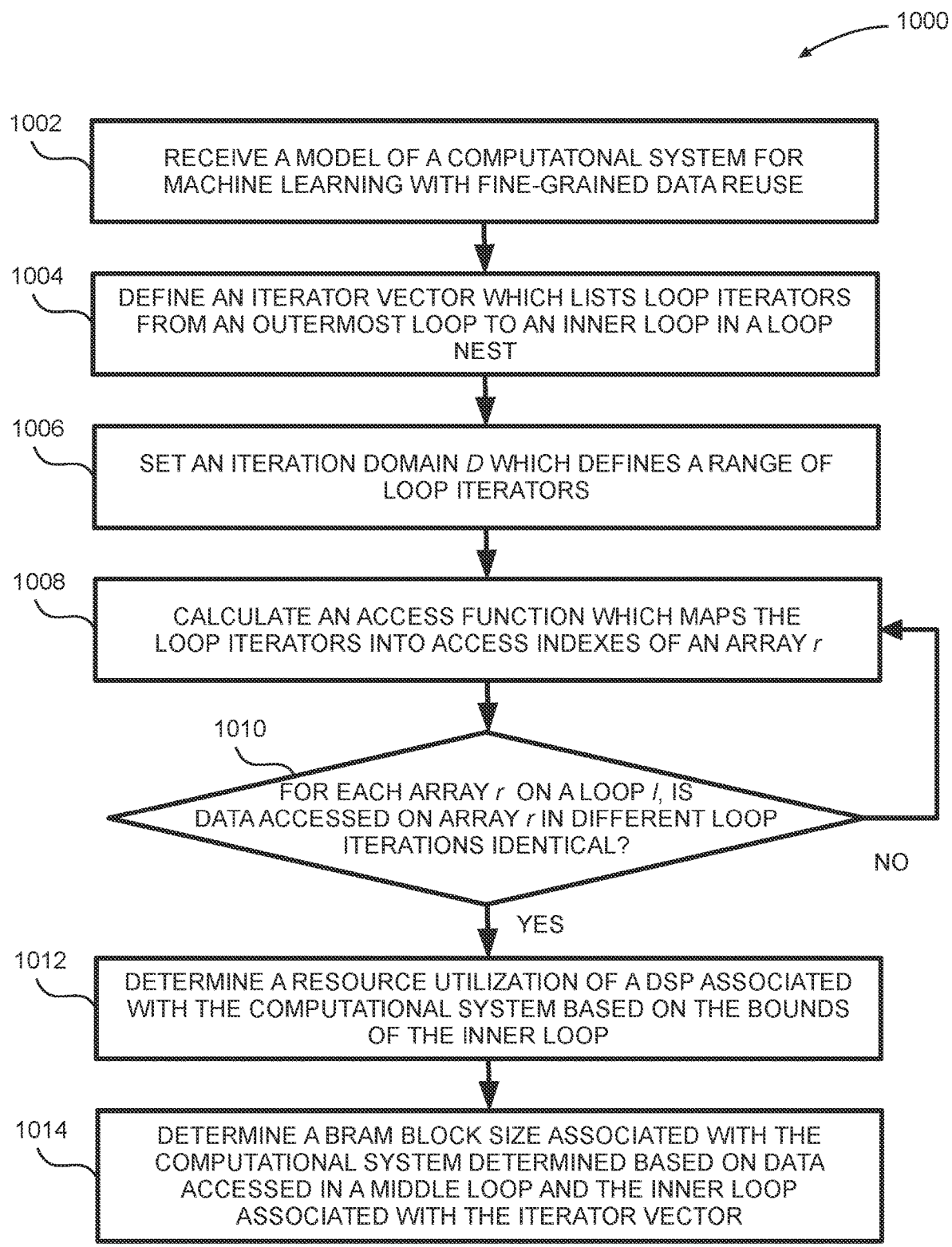
FIG. 10 is a flow diagram depicting an embodiment of a method for defining a computational system for machine learning with fine-grained data reuse.

FIG. 10 is a flow diagram depicting an embodiment of a method 1000 for defining a computational system for machine learning with fine-grained data reuse. At 1002, method 1000 receives a model of a computational system for machine learning with fine-grained data reuse. In some embodiments, having fine-grained data reuse in at least one of the three inner loops T0, T1 and T2 in a systolic array is mandatory for realizing a feasible mapping. In some embodiments, a binary variable $k_l$ is introduced to indicate loop-to-architecture mapping. In particular embodiments, $k_l$ is equal to 1 if a loop l is selected as one of the inner loops; otherwise, $k_l$ is equal to 0. A feasibility condition for a mapping is formulated as:

$$\Sigma k_l = 3, \forall r, \Sigma k_l \times c_{r,l} > 0$$

where $c_{r,l}$ indicates data reuse of array r on loop l; $c_{r,l}=1$ if loop l carries the fine-grained data reuse of an array r, otherwise $c_{r,l}=0$.

In some embodiments, determining fine-grained data reuse involves using a polyhedral model. At 1004, the method defines an iterator vector $\vec{i}$ Which lists loop iterators from an outermost loop to an innermost loop in a loop nest. At 1006, the method sets an iteration domain D which defines a range of loop iterators. In some embodiments, at 1008 the method also defines (calculates) an access function $F_r$ which maps the loop iterators to the access indexes of array r.

In some embodiments, fine-grained data reuse for array r on loop l requires the data accessed on array r in different loop l iterations to be the same. At 1010, method 1000 checks to determine whether for each array r on a loop l, data accessed on array r in different loop iterations identical. This can be formulated as the following condition:

$$\forall \vec{i} \in D, F_r(\ldots, i_{l-1}, i_l, i_{l+1}, \ldots) = F_r(i_0, \ldots, i_{l-1}, i_l+1, i_{l+1}, \ldots)$$

If the above condition is not satisfied, then the method returns to 1008. On the other hand if the above condition is satisfied at 1010, the method goes to 1012, where the method determines a resource utilization of a DSP associated with the computational system (systolic array) based on the bounds of the inner loop. Finally, at 1014, the method determines an on-chip block RAM (BRAM) size associated with the computation system based on accessed in a middle loop and the inner loop associated with the iterator vector.

In some embodiments, since computations performed by a systolic array as described herein are mostly floating-point multiplications and floating-point accumulations, DSP blocks and on-chip block RAM (BRAM) are the two most critical resource types. In some embodiments, DSP utilization is determined by a product of inner loop bounds $\vec{t}$:

$$DA_r(\vec{s}, \vec{t}) = |\{\vec{a} \lor \vec{a} = F_r(\vec{i}) \land \vec{i} \in D_{(\vec{s}, \vec{t})}\}|,$$

where $\vec{a}$ is an access vector of a multidimensional array, and $D_{(\vec{s}, \vec{t})}$ is an iteration domain of the middle loops and inner loops. In terms of implementation, counting an integer set with linear constraints as posed by the problem discussed above may be solved by using a polyhedral model; however, this model has high computational complexity. By leveraging salient features of a CNN algorithm (such as high computational complexity and high data reuse), a simplification of a model can be realized by counting the range of each dimension of the array access index, so that the total size is the product of range size of each dimension.

In some embodiments, address generation complexity associated with memory mapping is simplified by allocating actual memory size as rounded up to a value that is a power of 2. This allows an efficient BRAM implementation. Based on this, a total BRAM utilization is formulated as follows:

$$B(\vec{s}, \vec{t}) = \Sigma_r (c_b + 2^{\lceil \log_2 DA_r(\vec{s}, \vec{t}) \rceil}) + (c_p \times \Pi(\vec{t})),$$

where $c_b$ is a constant BRAM cost for any input buffers and output buffers associated with the systolic array, $c_p$ is a BRAM cost for each processing element, $\vec{t}$ is a bound vector associated with the inner loops.

In some embodiments, a performance associated with the computational system is modeled by a computation throughput and an external memory transfer throughput. In particular embodiments, the computation throughput is characterized by a DSP parallelism, a clock frequency, and a DSP calculation efficiency, and the external memory transfer throughput is characterized by a total external memory bandwidth, and an external memory bandwidth of at least one associated access port.

In some embodiments, a use of double buffering in the input and output allows a modeling of the throughput in a decoupled way, so the overall throughput T is dominated by the lower one of computation throughput (PT) and external memory transfer throughput (MT):

$$T(\vec{s}, \vec{t}) = \min(PT(\vec{s}, \vec{t}), MT(\vec{s}, \vec{t}))$$

Since the systolic array is executed in a fully pipelined manner, each PE will complete two floating point operations (multiplication and accumulation) in each cycle. However, a quantization effect associated with a data reuse strategy and caused due to inappropriate loop tiling size may lead to wasted computation on any incomplete data blocks on the boundaries of the original loops. By defining a clock frequency associated with the systolic array as F, the computational throughput is modeled as the number of effective floating operations in the original code performed every second:

$$PT(\vec{s}, \vec{t}) = \text{Eff}(\vec{s}, \vec{t}) \times \Pi \vec{t} \times 2 \times F,$$

where $\text{Eff}(\vec{s}, \vec{t})$ is the DSP efficiency defined earlier.

In some embodiments, external memory transfer throughput (MT) is defined as a number of effective floating-point operations performed in each block divided by the time it takes to transfer the data required by these operations. Due to a hardware feature, the memory bandwidth limitation is not only for overall memory access bandwidth $BW^{total}$, but also for each associated access port (e.g., a memory access port) $BW_{port}$ (array in, w, and out). The transferred data amount and bandwidth determines the data transfer time, so MT can be modeled as follows:

$$MT(\vec{s}, \vec{t}) = \min(MT_t(\vec{s}, \vec{t}), MT_r(\vec{s}, \vec{t})), r \in R$$

$$MT_t(\vec{s}, \vec{t}) = \frac{\mathit{Eff}(\vec{s}, \vec{t}) \times 2 \times \Pi(\vec{s} \times \vec{t})}{\Sigma DA_r(\vec{s}, \vec{t})/BW_{total}}$$

$$MT_r(\vec{s}, \vec{t}) = \frac{\mathit{Eff}(\vec{s}, \vec{t}) \times 2 \times \Pi(\vec{s} \times \vec{t})}{DA_r(\vec{s}, \vec{t})/BW_{port}}$$

In the above equations, $MT_t(\cdot)$ is used to denote a total memory throughput, while $MT_r(\cdot)$ is used to denote a memory throughput for an individual memory port.

Figure 11:
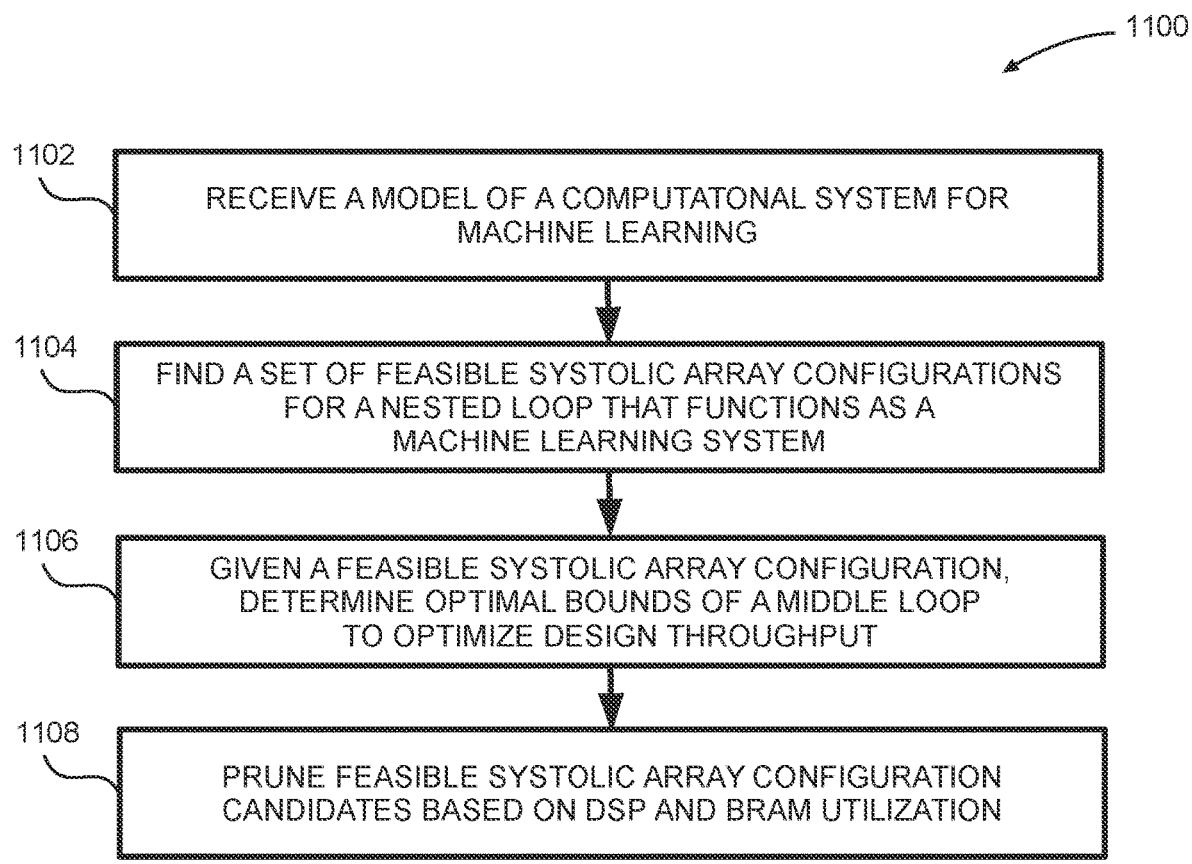
FIG. 11 is a flow diagram depicting an embodiment of a method for defining a computational system for machine learning.

FIG. 11 is a flow diagram depicting an embodiment of a method 1100 for defining a computational system for machine learning. At 1102, the method receives a model of a computational system for machine learning. In some embodiments, an implementation of this computational system is realized by a systolic array architecture as described herein. At 1104 the method finds a set of feasible systolic array configurations for a nested loop that functions as a machine learning system. At 1106, given a feasible systolic array configuration, the method determines various bounds of a middle loop to improve design throughput. Steps 1104 and 1106 can collectively be cast as a problem that is a combination of the following two subproblems:

Problem 1—step 1104: Given a nested loop L that functions as CNN, finding a set S that contains all feasible systolic array configurations:

$$S_f = \{(\vec{k}, \vec{t}) / \Sigma \vec{k} = 3, \Pi \vec{t} \leq D_{total}, \forall r, \Sigma k_i \times c_{ri} = 1\},$$

where $\vec{k}$ is the mapping vector discussed herein, and $\vec{t}$ is a vector representing bounds on the inner loops.

Problem 2—step 1106: Given a systolic array configuration $(\vec{k}, \vec{t})$, finding various bounds of middle loops $\vec{s}$ so that the following overall design throughput is substantially maximized:

$$\text{maximizing } T(\vec{s}, \vec{t}) \text{ s.t. } B(\vec{s}, \vec{t}) < B_{total}, D(\vec{t}) < D_{total},$$

where T, B, and D have been defined above. The complex calculation of $B(\vec{s}, \vec{t})$ and $T(\vec{s}, \vec{t})$ makes the problem neither linear nor convex, which in turn leads to the difficulty in analytical solving. On the other hand, the entire design space of the two problems is tremendously large, which makes a brute-force search impractical. In one embodiment, an implementation of the algorithm spends roughly 311 hours on traversing every design option for one of the convolutional layers from an AlexNet CNN model on Intel's Xeon E5-2667 CPU with 3.2 GHz frequency.

In order to work around the large search space, a two-phase design process is implemented. In a first phase, referred to as an architectural design phase, the design space is reduced by considering resource utilization and on-chip BRAM features. At 1108, method 1100 prunes feasible systolic array configuration candidates based on DSP and BRAM utilization. Due to the scalability of the systolic PE array architecture described herein, the clock frequency will not drop significantly with low DSP utilization. Hence, design options with low DSP utilization can be pruned by adding a following constraint to Problem 1:

$$\Pi \vec{t} \leq c_s \times D_{total},$$

where $c_s$ is a constant to set a lower bound of DSP utilization defined by a user. For example, by applying the above equation with $c_s=80$, the number of available systolic PE array mappings is reduced from 160K to 64K for one of the convolutional layers from an AlexNet CNN.

In some embodiments, the design space of data reuse strategies is further reduced in terms of value of $\vec{s}$ by leveraging the fact that BRAM sizes in the implementation are always rounded up to a power of two. In details, the design space is pruned by only exploring the candidates of $\vec{s}$ whose values are power of two. The pruned design space of data reuse strategies can cover an improved solution in the original design space because:

1) an associated throughput object function is a monotonic non-decreasing function of $\vec{s}$, and 2) BRAM utilization is the same for the options of $\vec{s}$ whose values have the same rounding-up power of two.

In this way, BRAM designs that are not powers of 2 and other inefficient BRAM implementations are pruned by the design process. By applying the pruning on the data reuse strategies, the design space reduces logarithmically so that an exhaustive search can be performed to find the best strategy. In some embodiments, this results in an additional 17.5×saving on the average search time for AlexNet convolutional layers. Consequently, the first phase of the design space exploration process takes less than 30 seconds to identify a set of high-throughput design options instead of hundreds of hours.

In the second phase of the design process, designs in the set are then synthesized using, for example, an Intel software development kit (SDK) for OpenCL Application to realize the clock frequency. An actual clock frequency is used to refine the performance estimation for determining the best systolic array design.

Figure 12:
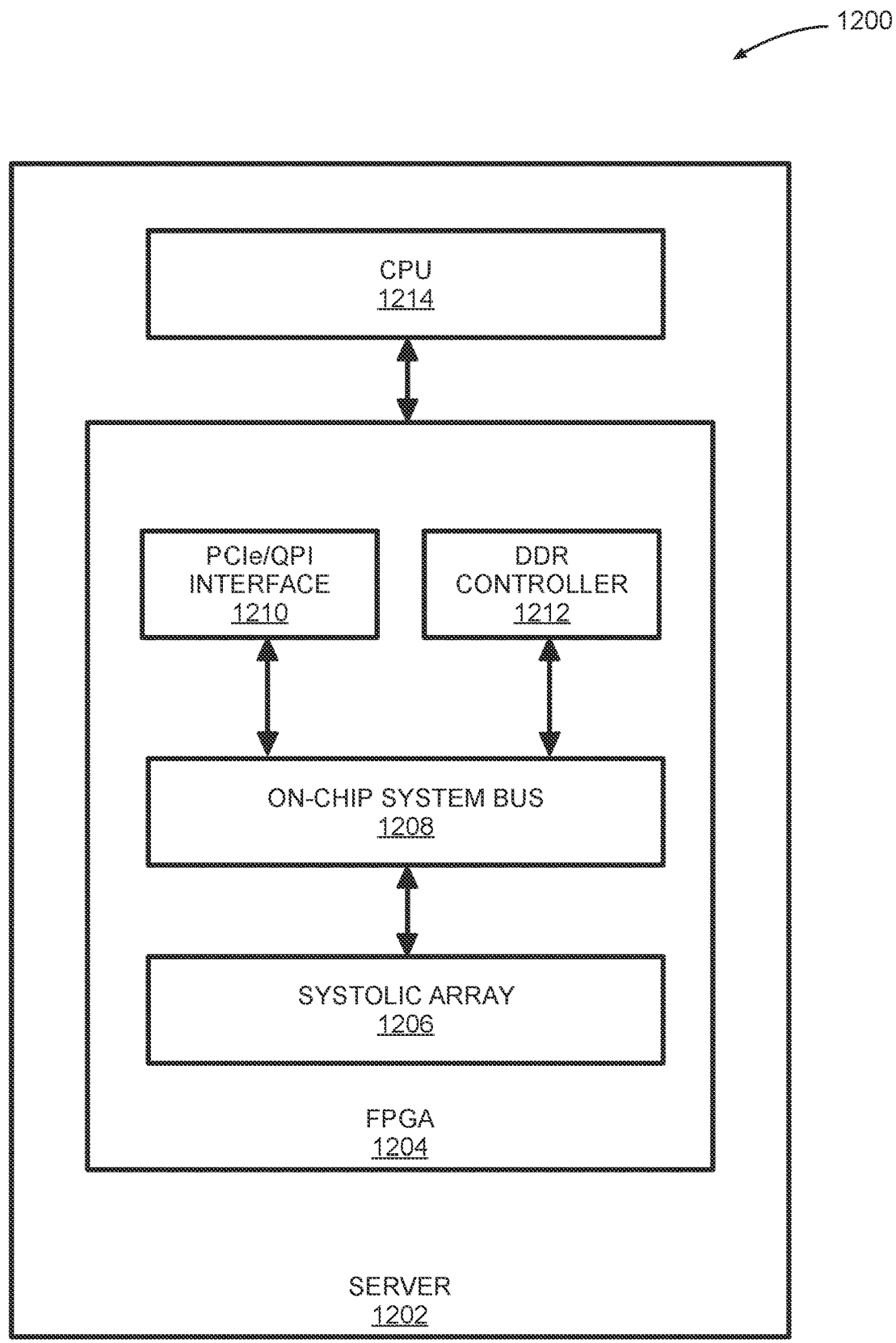
FIG. 12 is a block diagram depicting an embodiment of a host/accelerator model in servers.

FIG. 12 is a block diagram depicting an embodiment of a host/accelerator model 1200 in servers. In some embodiments, a server 1202 includes a CPU 1214 interfaced via a suitable communication protocol such as PCI Express or QPI, to an FPGA 1204 that includes a systolic array 1206 implemented using the systems and methods described above. FPGA 1204 also includes a PCI Express/QPI interface 1210 (depicted as a PCIe/QPI interface 1210 in FIG. 12), a DDR controller 1212, and an on-chip system bus 1208. PCI Express/QPI interface 1210 and DDR controller 1212 each communicate with systolic array 1206 via on-chip system bus 1208. In some embodiments, PCI Express/QPI interface 1210 is configured to communicate with peripheral devices using a PCI Express or communication protocol, while DDR controller 1212 is designed to interface systolic array 1212 with DDR memory.

In some embodiments, server 1202 can be used to implement an application which involves CNN computation, such as image recognition, video detection, audio processing and natural language processing. A light-loaded software framework (host program) can be executed on CPU 1214, while a heavy-loaded CNN computation is offloaded and accelerated in systolic array 1206 running on FPGA 1204. Compiler-generated systolic array 1206 performs the CNN acceleration as a register-transfer level (RTL) module in the FPGA design. This register transfer module connects to on-chip system bus 1208, via standard protocols such as AXI. Furthermore, on-chip system bus 1208 is then connected to any peripheral interface, including PCI Express/QPI interface 1212 and DDR controller 1214. Data (such as image frames and weights) are first transferred from CPU

1214 to the DDR memory (not shown) in FPGA 1204 through PCIe/QPI interface 1210, on-chip system bus 1208, and DDR controller 1212. After transferring the initial data, CPU 1214 starts the execution in systolic array 1206 by a signal via PCI Express/QPI interface 1210 and on-chip system bus 1208. Systolic array 1206 then fetches the data from the DDR memory in FPGA 1204 to systolic array 1206, and stores the results back to DDR memory (not shown) in FPGA 1204. After systolic array 1206 finishes the execution of CNN acceleration, CPU 1214 will detect the completion and transfer data from DDR memory in FPGA 1204 back to CPU 1214 via DDR controller 1212 and PCI Express/QPI interface 1210. This cycle constitutes a complete invoke of the acceleration using the systolic array. Multiple invokes can be performed in the system as well according to the application requirements.

The systolic array design described herein can be also applied to a multi-FPGA platform on a single server. The multiple input data (images) can be calculated on the multiple-FPGAs in parallel, where each FPGA has a systolic array module similar to that depicted in FIG. 12.

Figure 13:
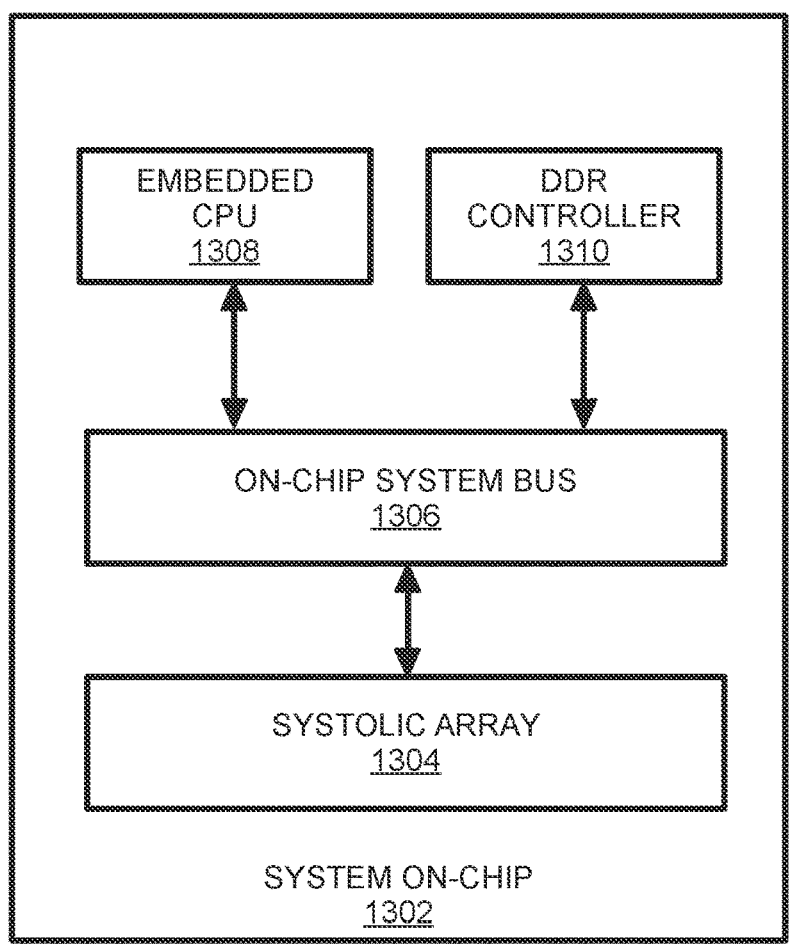
FIG. 13 is a block diagram depicting an embodiment of an embedded system.

FIG. 13 is a block diagram depicting an embodiment of an embedded system 1300. In some embodiments, a system-on-chip (SOC) 1302, with an embedded CPU 1308 is interfaced to a systolic array 1304 via an on-chip system bus 1306. On-chip system bus 1306 also interfaces with a DDR controller 1310. In some embodiments, systolic array 1304 is generated using the systems and methods described herein.

In embedded system 1300, the behavior of the system can be the same as the host/accelerator model 1200, with regard to embedded CPU 1308, systolic array 1304, and DDR controller 1310 communicate via on-chip system bus 1306. The whole application can be run in embedded system 1300 with systolic array 1304 functioning in part as an accelerator. In embedded system 1300, there is typically a shared memory space for embedded CPU 1308 and systolic array 1304 on the same FPGA chip. An RTL module generated by the systolic array generation systems and methods described herein can be also used in this scenario. As described for host/accelerator model 1200, systolic array 1304 can access the shared DDR memory (not shown) via on-chip system bus 1306, and embedded CPU 1308 can also send control signals directly to systolic array 1304 via on-chip system bus 1306. In some embodiments, embedded system 1300 can conduct the whole application via the existing system peripherals on embedded CPU 1308, while the computation on systolic array 1304 is accelerated.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

In this disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The invention claimed is:

1. A systolic array supporting a convolutional neural network (CNN), comprising:
   a two-dimensional array of reconfigurable processing elements arranged in rows and columns, each processing element having an associated single instruction multiple data (SIMD) vector and being connected through a local connection to at least one other processing element;
   an input feature map buffer having a double buffer for storing input feature maps;
   an interconnect system to pass data to neighboring processing elements in accordance with a processing element scheduler, and wherein
   a CNN computation is mapped onto the two-dimensional array of reconfigurable processing elements using an automated system configured to determine suitable reconfigurable processing element parameters.

2. The systolic array of claim 1, wherein the CNN computation is defined in a high-level C program, and wherein the mapping is performed from the high-level C program to an FPGA bitstream.

3. The systolic array of claim 1, wherein a processing element includes a digital signal processor (DSP) block or a vector processor consisting of multiple DSP blocks.

4. The systolic array of claim 1, wherein a processing element implements mathematical operations that include addition, subtraction, multiplication, and division, and wherein the processing element includes lookup tables.

5. The systolic array of claim 1, wherein the double buffer is comprised of a first buffer and a second buffer, wherein in a first data cycle the first buffer is configured to store data fetched by the systolic array from an external memory, wherein in the first data cycle the second buffer is configured to feed the data into a processing element, wherein in a second data cycle the second buffer is configured to store data fetched by the systolic array from an external memory, and wherein in the second data cycle the first buffer is configured to feed the data into a processing element.

6. The systolic array of claim 5, wherein each of the first buffer and the second buffer is comprised of an array of buffer segments, and wherein each buffer segment is coupled to a neighboring buffer segment via a local connection.

7. The systolic array of claim 1, wherein the CNN computation includes multiple nested loops.

8. The systolic array of claim 1, wherein the interconnect system defines bi-directional connections between reconfigurable processing elements of the two-dimensional array of reconfigurable processing elements in adjacent columns of the columns.

9. The systolic array of claim 8, wherein the interconnect system defines one directional connections between reconfigurable processing elements of the two-dimensional array of reconfigurable processing elements in adjacent rows of the rows.

10. The systolic array of claim 1, wherein the processing element scheduler is configured to implement timing protocols defining when each processing element passes data to a neighboring process element or receives data from a neighboring process element over the interconnect system.

11. The systolic array of claim 1, wherein the processing element scheduler is configured to control synchronization of data in the two-dimensional array of reconfigurable processing elements to implement pipelining between neighboring reconfigurable processing elements of the two-dimensional array of reconfigurable processing elements.

12. The systolic array of claim 1, wherein the processing element scheduler is configured to control synchronization of data in the two-dimensional array of reconfigurable processing elements to implement data reuse between neighboring reconfigurable processing elements of the two-dimensional array of reconfigurable processing elements.

13. The systolic array of claim 1, wherein the interconnect system implements multiple parallel channels between neighboring reconfigurable processing elements of the two-dimensional array of reconfigurable processing elements.

14. A systolic array, comprising:
   a two-dimensional array of reconfigurable processing elements arranged in rows and columns, each processing element having an associated single instruction multiple data (SIMD) vector and each being connected to adjacent reconfigurable processing elements of the two-dimensional array;

an input feature map buffer having a double buffer for storing input feature maps;

an interconnect system to pass data to neighboring processing elements in accordance with a processing element scheduler, and wherein a computation is mapped onto the two-dimensional array of reconfigurable processing elements using an automated system configured to determine suitable reconfigurable processing element parameters.

15. The systolic array of claim 14, wherein the double buffer is comprised of a first buffer and a second buffer, wherein in a first data cycle the first buffer is configured to store data fetched by the systolic array from an external memory, wherein in the first data cycle the second buffer is configured to feed the data into a processing element, wherein in a second data cycle the second buffer is configured to store data fetched by the systolic array from an external memory, and wherein in the second data cycle the first buffer is configured to feed the data into a processing element.

16. The systolic array of claim 14, wherein the interconnect system defines bi-directional connections between reconfigurable processing elements of the two-dimensional array of reconfigurable processing elements in adjacent columns of the columns and one directional connections between reconfigurable processing elements of the two-dimensional array of reconfigurable processing elements in adjacent rows of the rows.

17. The systolic array of claim 14, wherein the processing element scheduler is configured to implement timing protocols defining when each processing element passes data to a neighboring process element or receives data from a neighboring process element over the interconnect system.

18. The systolic array of claim 14, wherein the processing element scheduler is configured to control synchronization of data in the two-dimensional array of reconfigurable processing elements to implement pipelining between neighboring reconfigurable processing elements of the two-dimensional array of reconfigurable processing elements.

19. The systolic array of claim 14, wherein the processing element scheduler is configured to control synchronization of data in the two-dimensional array of reconfigurable processing elements to implement data reuse between neighboring reconfigurable processing elements of the two-dimensional array of reconfigurable processing elements.

20. The systolic array of claim 1, wherein the interconnect system implements multiple parallel channels between neighboring reconfigurable processing elements of the two-dimensional array of reconfigurable processing elements.

* * * * *